United States Patent
Mall

(10) Patent No.: US 10,827,166 B2
(45) Date of Patent: Nov. 3, 2020

(54) AUTOSTEREOSCOPIC CYLINDRICAL DISPLAY

(71) Applicant: Universal City Studios LLC, Universal City, CA (US)

(72) Inventor: Howard Bruce Mall, Winter Springs, FL (US)

(73) Assignee: Universal City Studio LLC, Universal City, CA (US)

( * ) Notice: Subject to any disclaimer, the term of this patent is extended or adjusted under 35 U.S.C. 154(b) by 0 days.

(21) Appl. No.: 16/450,433

(22) Filed: Jun. 24, 2019

(65) Prior Publication Data

US 2020/0137378 A1 Apr. 30, 2020

Related U.S. Application Data

(60) Provisional application No. 62/753,664, filed on Oct. 31, 2018.

(51) Int. Cl.
| | |
|---|---|
| *G03B 21/625* | (2014.01) |
| *H04N 13/363* | (2018.01) |
| *H04N 13/305* | (2018.01) |
| *H04N 9/31* | (2006.01) |
| *H04N 13/327* | (2018.01) |
| *H04N 13/351* | (2018.01) |
| *G02B 30/27* | (2020.01) |
| *H04N 13/31* | (2018.01) |

(52) U.S. Cl.
CPC .......... *H04N 13/363* (2018.05); *G02B 30/27* (2020.01); *G03B 21/625* (2013.01); *H04N 9/3141* (2013.01); *H04N 9/3179* (2013.01); *H04N 13/305* (2018.05); *H04N 13/327* (2018.05); *H04N 13/351* (2018.05); *H04N 13/31* (2018.05)

(58) Field of Classification Search
CPC ........ G03B 21/26; G03B 21/28; G03B 21/62; G03B 21/602; G03B 21/625; H04N 13/31; H04N 13/122; H04N 13/302; H04N 13/305; H04N 13/307; H04N 13/327; H04N 13/344; H04N 13/351; H04N 13/363
See application file for complete search history.

(56) References Cited

U.S. PATENT DOCUMENTS

| | | | |
|---|---|---|---|
| 3,822,936 | A | 7/1974 | Troje et al. |
| 6,795,241 | B1 | 9/2004 | Holzbach |
| 6,801,185 | B2 | 10/2004 | Salley |
| 8,118,674 | B2 | 2/2012 | Burak et al. |
| 9,182,524 | B2 | 11/2015 | Smithwick et al. |

(Continued)

OTHER PUBLICATIONS

Hsu Che-Hao et al.,"HoloTube: a low-cost portable 360-degree interactive autostereoscopic display," Multimedia Tools and Applications, Apr. 21, 2016, vol. 76, No. 7, pp. 9099-9132.

(Continued)

*Primary Examiner* — Sultan Chowdhury
(74) *Attorney, Agent, or Firm* — Fletcher Yoder, P.C.

(57) ABSTRACT

An image projection system may include a translucent or transparent projection screen and multiple lenticules disposed on or within the projection screen. The image projection system may also include a projector to project multiple images onto the projection screen. The images may include multiple views of a scene, and the projector may simultaneously project the images to generate a three-dimensional display of the scene.

20 Claims, 5 Drawing Sheets

(56) References Cited

U.S. PATENT DOCUMENTS

| | | | |
|---|---|---|---|
| 2005/0041218 A1* | 2/2005 | Hoshino | G03B 21/14 |
| | | | 353/94 |
| 2005/0264882 A1* | 12/2005 | Daiku | G02B 27/0172 |
| | | | 359/465 |
| 2006/0109200 A1 | 5/2006 | Alden | |
| 2007/0165027 A1 | 7/2007 | Nakadaira et al. | |
| 2010/0014053 A1 | 1/2010 | Brentnall, III et al. | |
| 2012/0127320 A1* | 5/2012 | Balogh | H04N 13/363 |
| | | | 348/180 |
| 2012/0313839 A1 | 12/2012 | Smithwick et al. | |
| 2013/0033650 A1* | 2/2013 | Roberts | G09F 19/18 |
| | | | 348/744 |
| 2013/0135588 A1* | 5/2013 | Popovich | G03B 21/28 |
| | | | 353/8 |
| 2015/0212333 A1 | 7/2015 | Goulanian | |
| 2015/0370080 A1* | 12/2015 | Meacham | G02B 30/27 |
| | | | 353/7 |

OTHER PUBLICATIONS

PCT/US2019/047329 International Search Report and Written Opinion dated Nov. 4, 2019.

\* cited by examiner

AUTOSTEREOSCOPIC CYLINDRICAL DISPLAY

CROSS-REFERENCE TO RELATED APPLICATION

This application claims priority from and the benefit of U.S. Provisional Application No. 62/753,664, entitled "AUTO STEREOSCOPIC CYLINDRICAL DISPLAY," filed Oct. 31, 2018, which is hereby incorporated by reference in its entirety for all purposes.

BACKGROUND

The present disclosure relates generally to autostereoscopic image viewing systems, and more specifically to systems for providing a three-dimensional (3D) image viewable from multiple angles, e.g., up to 360 degrees.

In general, 3D displays are designed to provide a viewer with an image of perceived depth to generate an illusion using an image that is projected onto a planar or two-dimensional (2D) surface (e.g., a projection screen). Some 3D systems use worn devices such as glasses or goggles to separate the vision of the viewer's eyes from each other to aid in creating such an effect. In contrast, autostereoscopic displays provide a 3D visual effect without the use of a worn device or other intermediary aid beyond the surface of the screen. However, in general, many such displays provide the desired effect from a limited range of angles and/or use viewer eye tracking to maintain the effect, thereby increasing complexity and/or limiting the number of potential viewers.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In an embodiment, an image projection system may include a translucent or transparent projection screen and multiple lenticules disposed on or within the projection screen. The image projection system may also include a projector to project multiple images onto the projection screen. The images may include multiple views of a scene, and the projector may simultaneously project the images to generate a three-dimensional display of the scene.

In another embodiment, a system may include a curved projection screen formed from a material having a light transmittance of at least 85%. The system may also include a projector to project an interlaced image of multiple renderings of a scene, wherein each of the renderings corresponds to a viewing angle of the scene. The system may also include a conical reflector to receive the image from the projector and reflect the image to the curved projection screen.

In yet another embodiment, a method of displaying three-dimensional content may include determining one or more implementation factors corresponding to a three-dimensional display or an environment of the three-dimensional display. The method may also include calibrating multiple images corresponding to different views of a scene based at least in part on the implementation factors. The method may also include outputting, via a light source, the calibrated images, reflecting the images via a conical reflector, and displaying the images on a curved projection screen. The images may be viewable through lenticules disposed about the curved projection screen.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present techniques provide an autostereoscopic three-dimensional (3D) display of an image that is viewable from multiple angles and that may be implemented without the use of headgear, glasses, or a worn optical aid to create a perceived depth illusion. In some embodiments, an autostereoscopic effect may be generated by incorporating a parallax barrier or lenticular surface on or in a surface of a display (e.g., a screen). The parallax barrier or lenticules may cause one eye of a viewer to see a different image from the other eye, which, in turn, generates the illusion of perceived depth. As provided herein, a curved projection screen, for example a cylindrical display, may be used to provide viewing from multiple angles (e.g., up to 360 degrees around a display). Further, the disclosed techniques permit autostereoscopic images to be displayed without using complex moving parts, such as a spinning projector, a movable screen, and/or shutters. Accordingly, the disclosed techniques are less costly to manufacture while nonetheless providing 360 degree autostereoscopic views.

An autostereoscopic display viewable from multiple angles (e.g., viewable around a screen up to 360 degrees) provides opportunities to exhibit variable and/or moving content in a 3D and realistic fashion without replacing physical media or surroundings. Such displays may be used in a variety of implementations including, but not limited to, museum-like displays, projected performances, signage, etc. Additionally, amusement park rides may utilize such displays as part of a realistic surrounding in a ride, a show-piece in a queue for a ride, an immersive experience, etc.

Figure 1:
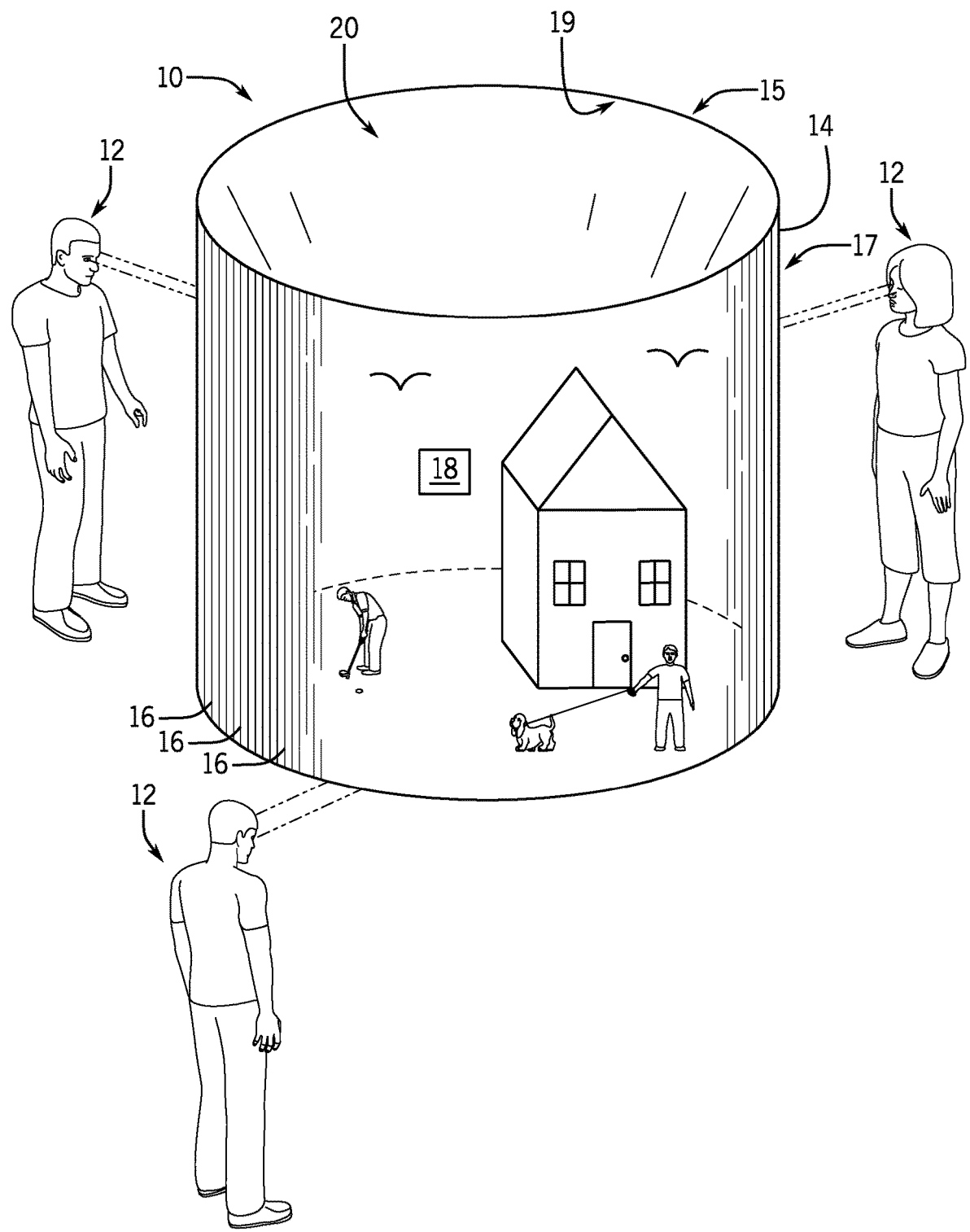
FIG. 1 is a perspective view of a cylindrical autostereoscopic display, in accordance with aspects of the present disclosure.

FIG. 1 is a perspective view of one embodiment of a 3D display 10 viewable from multiple angles to multiple viewers 12. The 3D display 10 may include a curved projection screen 14 (e.g., a cylinder, half or partial cylinder, annulus, sphere, or other curved volume or portion of a curved volume) with lenticules 16, or a parallax barrier, running vertically down the side of the curved projection screen 14. The curved projection screen 14 may be of any suitable type of projection screen, for example a rear projection screen. In the depicted embodiment, vertical lenticules 16 are shown on an outer surface 17 of the curved projection screen 14 and correspond to the orientation of a 3D image 18 with respect to the viewer(s) 12. As such, the lenticules 16 may be arranged in any suitable orientation depending on implementation. Additionally, the lenticules 16 may be formed directly into the curved projection screen 14 (e.g., etched, molded, or embossed into the screen material) or applied as a lenticular film, and may be positioned on an inner surface 19 or the outer surface 17 of the curved projection screen 14. Together, the curved projection screen 14 and lenticules 16 form a screen structure 15.

To allow projected light through the curved projection screen 14, the curved projection screen 14 may be formed from a generally transparent, translucent, and/or wavelength dependent transparent material (e.g., glass, crystal, plastic, polymer materials, etc.). In some embodiments, the curved projection screen 14, with or without the lenticules 16, may have a light transmittance of at least, 55%, 75%, 85%, or 95%. Additionally, the curved projection screen or screen structure 15 may have an opacity of less than 60%, less than 40%, less than 25%, or less than 5% to maintain clarity of the 3D image 18. Additionally or alternatively, the curved projection screen 14 may have different transmittance, reflection, absorption, and/or opacity for light incident from the inner surface 19 vs the outer surface 17. As such, light may have a greater transmittance projecting towards a viewer 12 than into the 3D display 10. In one embodiment, a viewer 12 may be unable to see inside the screen structure 15, but the projected image may be viewed on the outer surface 17 of the screen structure 15. Furthermore, as will be appreciated, some embodiments may include a curved projection screen 14 or screen structure 15 having a transmittance less than 55% and/or an opacity greater than 60%, depending on implementation.

The lenticules 16 may be formed as multiple lenticular lenses with a density and/or shape selected based on a desired viewing distance of the viewer 12. The lenticules 16 or lenticular film including the lenticules 16 may be formed from a generally translucent or transparent material. As mentioned above with respect to the curved projection screen 14, the lenticular material or screen structure 15 of both the lenticules 16 and curved projection screen 14 may have a light transmittance of at least, 55%, 75%, 85%, or 95% and/or an opacity of less than 60%, less than 40%, less than 25%, or less than 5%. In other embodiments, a parallax barrier including alternating opaque and translucent or transparent strips may also render a similar optical effect. As discussed herein, the lenticules 16 may be formed integrally with the curved projection screen 14 or may be applied as a film, sheet, or other structure onto the curved projection screen 14. Further, the lenticules 16 may be implemented apart from the curved projection screen 14 (e.g., spaced a distance from the inner surface 19, spaced a distance from the outer surface 17, or as a lens in front of a projector, or disposed on a reflector between the projector and the curved projection screen 14). In the depicted embodiment, the lenticules 16 are integral with or directly coupled to the curved projection screen 14. In general, the lenticules 16 or parallax barrier operate to bend light such that the viewer's right and left eyes receive different images that produce an autostereoscopic effect. The curved projection screen 14 and associated lenticules 16 may be stationary and/or fixed in place relative to an environment.

In one embodiment, the 3D image 18 (e.g., a rendering of a scene or object desired to be viewed with perceived depth) may be projected onto the curved projection screen 14 from a projector or other source. Multiple different slivers or portions representing partial views of the same 3D image 18, corresponding to views from different perspectives (e.g., from different angles around the 3D image 18), may be projected simultaneously onto the curved projection screen 14 and aligned with the lenticules 16. The lenticules 16 shutter the light rays, for example in the vertical direction, so that each sliver may be observed through a narrow field of view. In some embodiments, each sliver of the 3D image 18 may be projected onto a single lenticule 16 or a grouping of lenticules 16. When a viewer 12 looks at the 3D display 10, each of the viewer's eyes may see a different sliver of the 3D image 18, generating a perceived depth illusion and the 3D image 18. For example, the illusion may cause the viewer to perceive that the 3D image 18 is an object that is located in space at a location corresponding to the enclosed space 20 formed by the screen. As a viewer 12 moves around the 3D display 10, the viewed perspective of the 3D image 18 may change. For example, if a viewer 12 sees a side of a house from one angle, the viewer 12 may move to the opposite side of the 3D display 10 to see the opposite side of the house and objects behind the house not seen from the first vantage point. Additionally, different 3D images 18 may be displayed in succession to yield an animated (e.g., moving) 3D scene.

Figure 2:
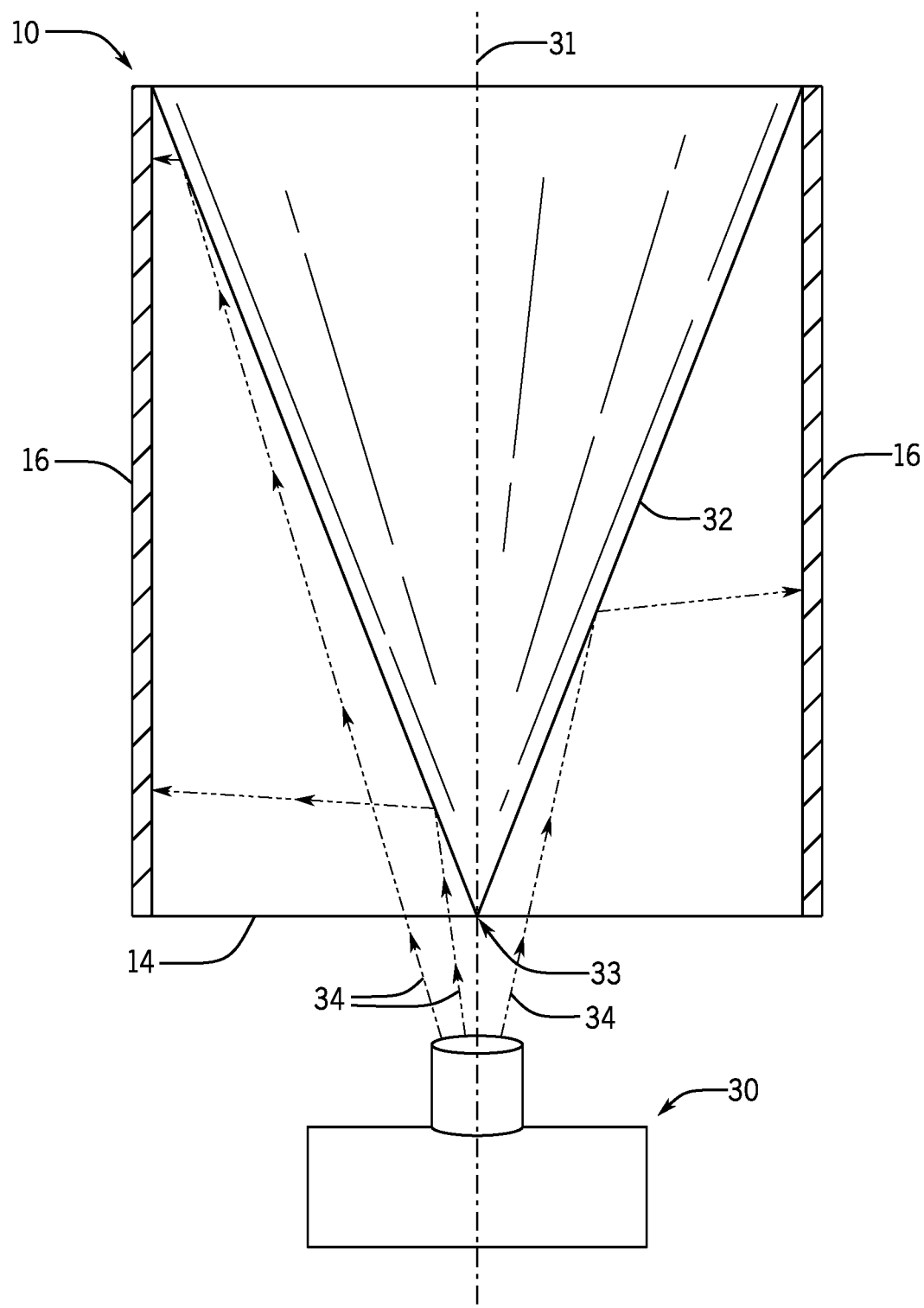
FIG. 2 is a partial cutaway schematic view of the display of FIG. 1, in accordance with aspects of the present disclosure.

To help illustrate, FIG. 2 is a partial cutaway view of the 3D display 10 including a stationary (e.g., relative to the curved projection screen 14) projector 30 centered along an axis 31 (e.g., a center axis or other appropriate axis depending on implementation) of the curved projection screen 14. In some embodiments, the projector 30 may be located above, below, or within the confines of the curved projection screen 14. Additionally, in the depicted embodiment, the projector 30 is oriented towards the point 33 of a conical reflector 32 to reflect light rays 34 from the projector 30 to the outer edge of the curved projection screen 14. The conical reflector 32 may be centered on the axis 31 such that the axis 31 bisects the point 33 of the conical reflector 32. As such, the projector 30 may be centered over the point 33 of the conical reflector 32. Additionally, in some embodiments, the conical reflector 32 may extend from the top edge of the curved projection screen 14 to the bottom of the curved projection screen 14, as illustrated. However, different size (e.g., larger and smaller) conical reflectors 32 may also be used, depending on implementation, to reflect the light rays 34 from the projector 30 to the curved projection screen 14. The conical reflector 32 serves to unwrap the 3D image 18 from a planar output of the projector 30 and yield a panoramic view of up to 360 degrees around the curved projection screen 14. The conical reflector 32 may be made of any suitable reflective material (e.g., having a reflectivity of greater than 80%, greater than 90%, or greater than 98%) such as Mylar, aluminum, silver, tin, etc. In one embodiment, the conical reflector 32 may include a glass or acrylic mirror. In some embodiments, the curved projection screen 14 may be solid with the conical reflector 32 built-in, or the curved projection screen 14 may be hollow, forming, for example, an annulus around the conical reflector 32. As stated above, the curved projection screen may be one of multiple shapes (e.g., a cylinder, half or partial cylinder, annulus, sphere, or other curved volume or portion of a curved volume). As such, the geometry and placement of the conical reflector 32, projector 30, and lenticules 16 may be altered depending on implementation. For example, if the curved projection screen 14 makes up a half cylinder, a halved conical reflector 32 may be used to reflect the light rays 34 to the curved projection screen 14. Additionally or alternatively, the projector 30 may be aimed at a point other than point 33 of the conical reflector 32 depending on the implementation.

Figure 3:
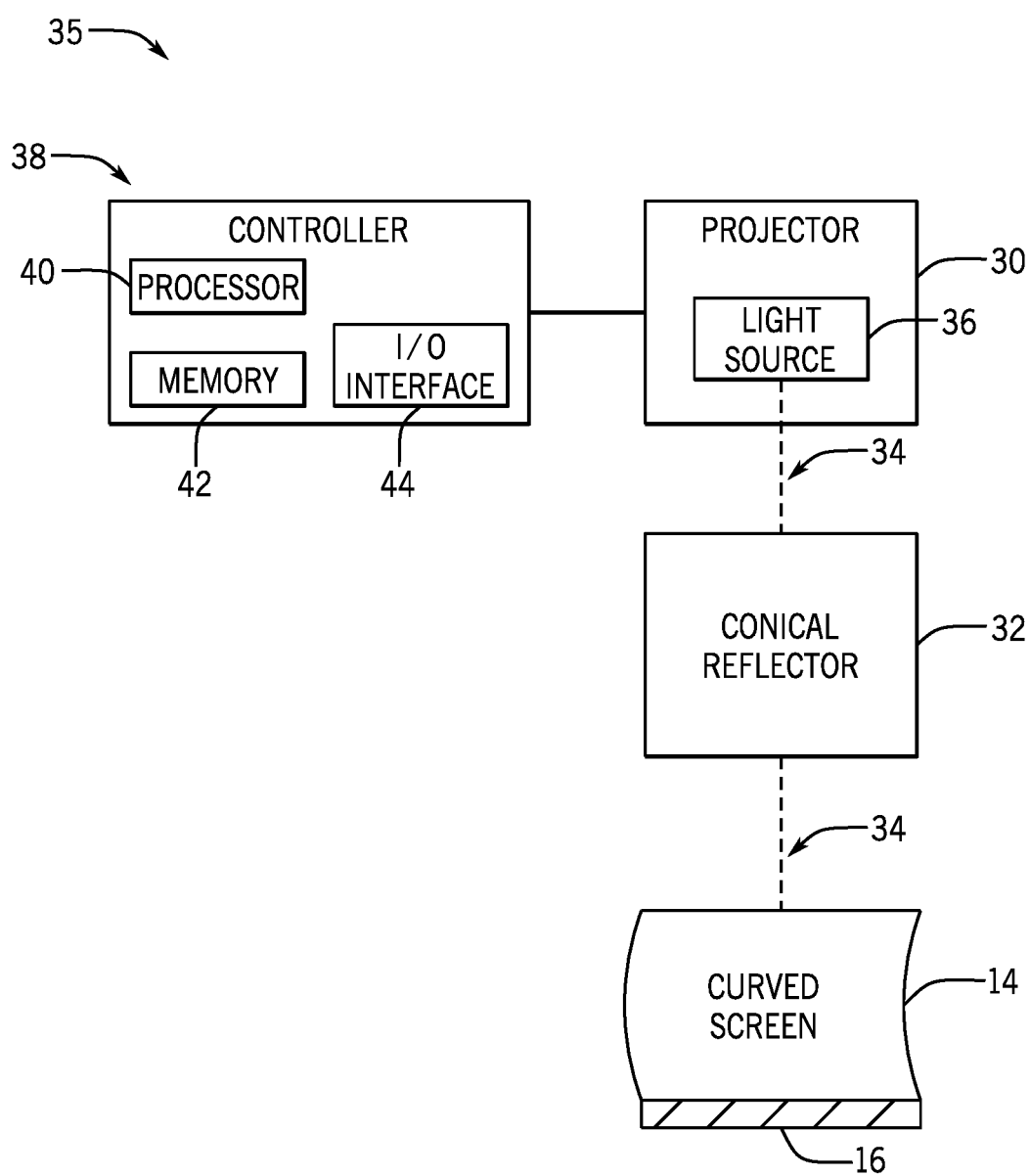
FIG. 3 is a block diagram of a system for displaying 3D images, in accordance with aspects of the present disclosure.

In some embodiments, a controller 38 may assist in processing images, prior to projection, and/or controlling the projector 30, as depicted in the block diagram showing a control system 35 of FIG. 3. The controller 38 may include a processor 40, memory 42, and/or an input/output (I/O) interface 44 to receive, process, and/or output image data for the 3D display 10. Processed imagery may be communicated from the controller 38 to the projector 30, and a light source 36 within the projector 30 may output light rays 34 to the conical reflector 32 and curved projection screen 14 for viewing. The processor 40 may include one or more general purpose microprocessors, one or more application specific integrated circuits (ASICs), one or more field programmable logic arrays (FPGAs), or any combination thereof. The memory 42 may store data to be processed by the processor 40, and may include one or more tangible, non-transitory, computer-readable mediums. For example, the memory 42 may include random access memory (RAM), read only memory (ROM), rewritable non-volatile memory such as flash memory, hard drives, optical discs, and/or the like. Additionally, the light source 36 may be of any suitable type (e.g., laser, incandescent bulb, light emitting diode (LED), liquid crystal, etc.) depending on implementation.

In some embodiments, the controller 38 may pre-process the 3D image 18 and store processed images in memory 42 for projection at a later time. Furthermore, the controller 38 may be implemented together or separately from the projector 30. Depending on implementation, a controller 38 separate from the projector 30 may process imagery to be projected and a second controller may directly control the projector 30.

The processing of a 3D image 18, or a collection of 3D images 18 (e.g., to show animation) may depend upon one or more factors subject to a desired implementation. The 3D image 18 to be displayed and/or the projector 30 may be calibrated based at least in part on such factors. For example, the number of renderings of a 3D image 18 from different angles (e.g., slivers of the 3D image 18) may vary depending on desired fidelity, number of lenticules 16, and/or size of the curved projection screen 14. In some embodiments, a curved projection screen 14 encompassing 360 degrees (e.g., a cylindrical screen) may utilize at least 60, at least 360, or at least 720 renderings of the 3D image 18 from different angles. Furthermore, the number of lenticules 16 and/or size of the curved projection screen 14 may vary from a small exhibit (e.g., less than a 1 cubic foot (0.028 cubic meters) in volume) to a life size display (e.g., greater than 250 cubic feet (7.08 cubic meters) in volume). Additionally, lenticules 16 generally rely on multiple curved surface ridges to shutter the light rays 34 for the viewer 12. In some embodiments, a viewer's distance from the 3D display 10 may affect the perceived 3D effect by changing which slivers of the 3D image 18 are seen by each of the viewer's eyes. As such, the projected image may be calibrated based on an estimated, average, and/or set viewing distance. Further, the multiple slivers of the 3D image 18 may be "wrapped" or together as a single image to be output by the projector 30, such that when projected onto the conical reflector 32, the slivers are "unwrapped" and reflected onto the circumference of the curved projection screen 14. Such wrapping and unwrapping may correspond to the geometries of the conical reflector 32 and the curved projection screen 14 as well as the relative distances between the projector 30, conical reflector 32, and curved projection screen 14.

Figure 4:
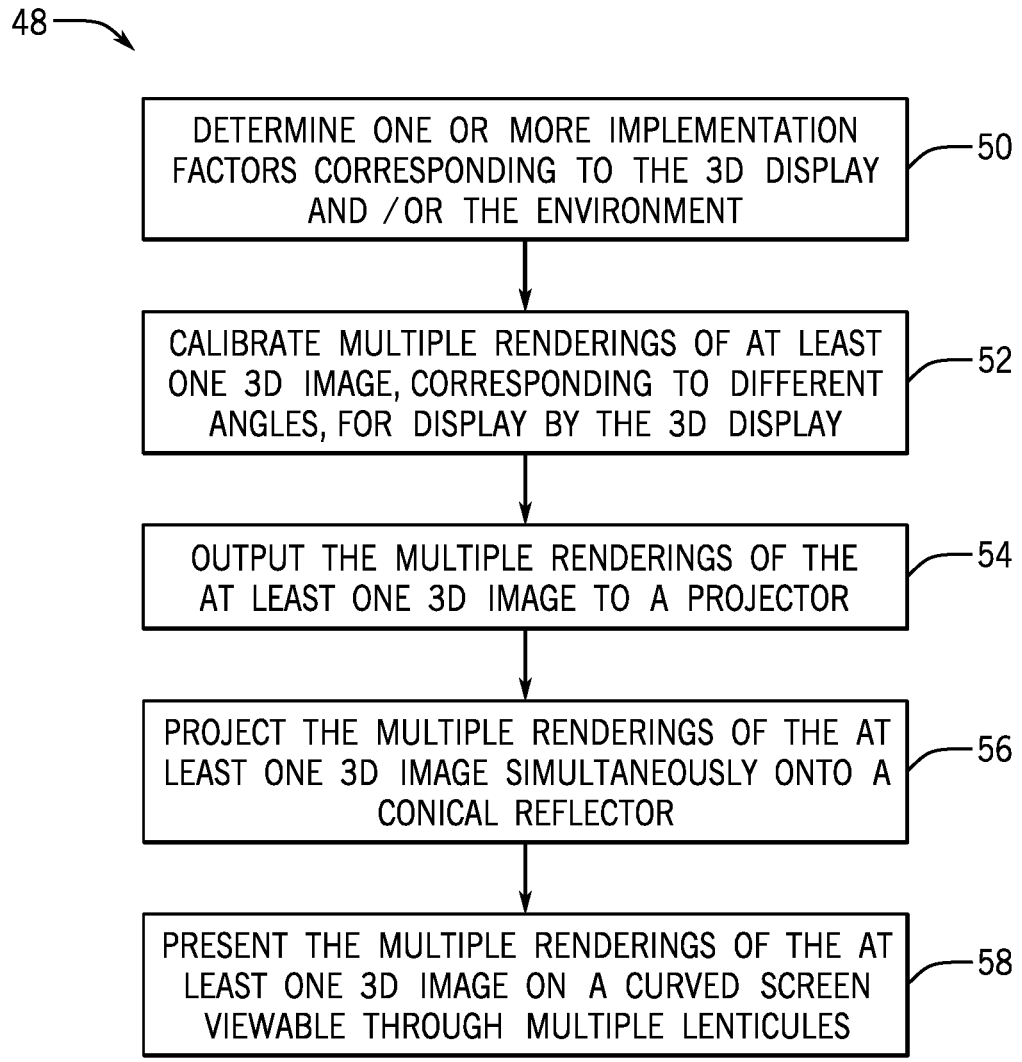
FIG. 4 is a flowchart for displaying 3-dimensional content, in accordance with aspects of the present disclosure.

To help further illustrate, FIG. 4 is a flowchart 48 of an example process for generating a 3D image 18 viewable from up to 360 degrees around a curved projection screen 14. As indicated above, one or more implementation factors may be determined corresponding to the 3D display and/or the environment (e.g., viewing distance) (process block 50). Multiple renderings of at least one 3D image 18, corresponding to different viewing angles around the 3D display 10, may be calibrated (e.g., processed and/or formatted) for display by the 3D display 10 (process block 52) based at least in part on the implementation factors. The calibrated multiple renderings of the at least one 3D image 18 may be output to the projector 30 (process block 54) and projected simultaneously onto a conical reflector 32 (process block 56). If multiple 3D images 18 are to be displayed in sequence to animate the scene, the calibrated multiple renderings of a single 3D image 18 (e.g., an image frame) may be projected simultaneously followed by the calibrated multiple renderings of a subsequent frame. The multiple renderings of the at least one 3D image 18 may then be presented on the curved projection screen 14 viewable through the multiple lenticules 16 (process block 58) to yield an autostereoscopic rendition of an object or scene.

Figure 5:
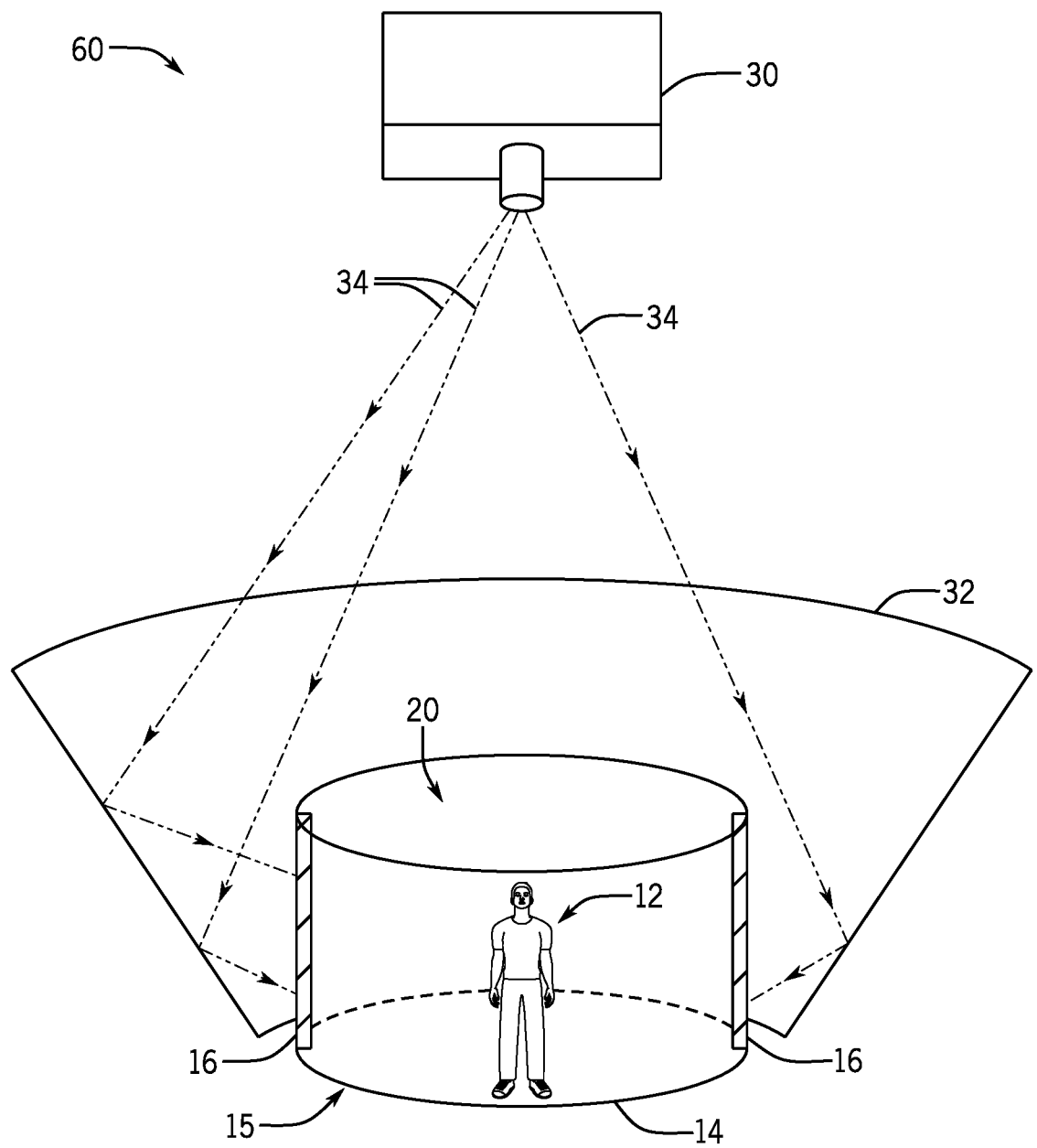
FIG. 5 is a schematic perspective view of a cylindrical autostereoscopic display surrounding a viewer, in accordance with aspects of the present disclosure.

Although depicted in FIG. 1 as a 3D display 10 to be viewed from around the curved projection screen 14, a 3D surround display 60 may include a curved projection screen 14 that at least partially encompasses the viewer 12, as shown in FIG. 5. In some embodiments, the viewer 12 may be partially or completely surrounded by the curved projection screen 14, providing an immersive experience. Relative to the viewer 12, the conical reflector 32 may be positioned at a location outside of the enclosed space 20 formed by the curved projection screen 14, allowing the light rays 34 to travel to the curved projection screen 14 from the projector. Additionally, the conical reflector 32 may be truncated corresponding to an end (e.g., floor or ceiling) of the curved projection screen 14. For example, the conical reflector 32 and/or curved projection screen 14 of the 3D surround display 60 may form a half cone and half annulus (e.g., forming 180 degrees of an annulus) respectively, a full cone and full annulus respectively, or any suitable amount of solid angle around the viewer 12. As discussed above in regards to the 3D display 10, the projector 30 of the 3D surround display 60 may be above the curved projection screen 14 or below depending on implementation, and the calibrating/processing of the 3D image 18 may include the same and/or similar factors.

While only certain features of the invention have been illustrated and described herein, many modifications and changes will occur to those skilled in the art. It is, therefore,

The invention claimed is:

1. An image projection system, comprising:
a projection screen, wherein the projection screen is translucent or transparent;
a plurality of lenticules disposed on or in the projection screen; and
a projector configured to project a plurality of images onto the projection screen, wherein the plurality of images comprise a plurality of views of a scene, wherein the projector is configured to simultaneously project the plurality of images to generate a three-dimensional display of the scene, wherein the plurality of images comprises a first plurality of images corresponding to a first frame and a second plurality of images corresponding to a second frame, and wherein the projector is configured to project the second plurality of images after projecting the first plurality of images to simulate movement within the scene.

2. The image projection system of claim 1, comprising a conical reflector configured to reflect the plurality of images from the projector onto the projection screen.

3. The image projection system of claim 2, wherein the conical reflector is located within an enclosed space formed by the projection screen.

4. The image projection system of claim 2, wherein the projector is configured to project the plurality of images from a position outside of an enclosed space formed by the projection screen.

5. The image projection system of claim 1, wherein the projection screen forms at least a partial cylinder.

6. The image projection system of claim 5, wherein the projection screen forms a full cylinder, and the three-dimensional display is viewable from 360 degrees around the projection screen.

7. The image projection system of claim 1, wherein the projection screen is configured to be viewed from outside an enclosed space formed by the projection screen.

8. The image projection system of claim 1, wherein the plurality of lenticules are configured to shutter at least one image of the plurality of images when viewed from an individual viewing position.

9. The image projection system of claim 1, wherein the three-dimensional display is autostereoscopic.

10. A system comprising:
a curved projection screen, wherein the curved projection screen is formed from a material having a light transmittance of at least 55%;
a projector configured to project a plurality of renderings of a scene, wherein each rendering of the plurality of renderings corresponds to a viewing angle of the scene; and
a conical reflector configured to receive the projected plurality of renderings from the projector and reflect the plurality of renderings to the curved projection screen.

11. The system of claim 10, wherein the curved projection screen comprises a lenticular film configured to shutter the plurality of renderings.

12. The system of claim 10, wherein the conical reflector is configured to reflect the plurality of renderings about a circumference of the curved projection screen.

13. The system of claim 12, wherein the curved projection screen forms a partial cylinder.

14. The system of claim 10, wherein the curved projection screen is configured to at least partially surround a viewer.

15. The system of claim 10, comprising a controller configured to calibrate the plurality of renderings, wherein calibrating the plurality of renderings comprises compensating for a size of the curved projection screen or the conical reflector, compensating for a number of lenticules on or within the curved projection screen, compensating for a distance to a predetermined viewing location, or a combination thereof.

16. The system of claim 10, wherein the conical reflector is truncated.

17. A method of displaying three-dimensional content comprising:
determining one or more implementation factors corresponding to a three-dimensional display or an environment of the three-dimensional display;
calibrating a plurality of images corresponding to different views of a scene based at least in part on the one or more implementation factors;
outputting, via a light source, the calibrated plurality of images;
reflecting the calibrated plurality of images via a conical reflector; and
displaying the calibrated plurality of images on a curved projection screen, wherein the calibrated plurality of images are viewable through a plurality of lenticules disposed about the curved projection screen.

18. The method of claim 17, wherein the one or more implementation factors comprise an amount of the plurality of images, an amount of lenticules, a size of the curved projection screen, a distance between the curved projection screen and a viewing location, a geometry of the curved projection screen, a geometry of the conical reflector, a position of a projector relative to the curved projection screen or the conical reflector, or a combination thereof.

19. The method of claim 17, wherein outputting, via the light source, the calibrated plurality of images comprises projecting the calibrated plurality of images towards the conical reflector, wherein the calibrated plurality of images are stored in a memory prior to being projected.

20. The method of claim 17, wherein the determining is performed via a processor of a controller.

* * * * *